United States Patent
Hannukalnen et al.

(10) Patent No.: US 9,266,394 B2
(45) Date of Patent: Feb. 23, 2016

(54) VEHICLE AXLES WITH VARIABLE TRACK WIDTH

(75) Inventors: Petri Hannukalnen, Haapaniemi (FI); Mikko Rintoo, Palokka (FI); Jouni Hirvonen, Suolahti (FI)

(73) Assignee: VALTRA OY AB, Suolahti (FI)

(*) Notice: Subject to any disclaimer, the term of this patent is extended or adjusted under 35 U.S.C. 154(b) by 71 days.

(21) Appl. No.: 13/996,564

(22) PCT Filed: Dec. 19, 2011
(Under 37 CFR 1.47)

(86) PCT No.: PCT/EP2011/073242
§ 371 (c)(1),
(2), (4) Date: Jun. 9, 2014

(87) PCT Pub. No.: WO2012/084827
PCT Pub. Date: Jun. 28, 2012

(65) Prior Publication Data
US 2014/0292064 A1    Oct. 2, 2014

(30) Foreign Application Priority Data
Dec. 21, 2010  (GB) .................................. 1021608.3

(51) Int. Cl.
*B60B 35/10* (2006.01)
*B60B 35/12* (2006.01)
*B62D 49/06* (2006.01)

(52) U.S. Cl.
CPC ........... *B60B 35/125* (2013.01); *B60B 35/1054* (2013.01); *B60B 35/12* (2013.01); *B60B 2900/531* (2013.01); *B62D 49/0678* (2013.01)

(58) Field of Classification Search
CPC .......................... B60B 35/1072; B60B 35/109
USPC .......................................................... 301/128
See application file for complete search history.

(56) References Cited

U.S. PATENT DOCUMENTS 2,535,762 A * 12/1950 Tapp et al. .................... 180/340
2,546,453 A *  3/1951 Koenig ......................... 403/319
(Continued)

FOREIGN PATENT DOCUMENTS

| EP | 0364002 A2 | 4/1990 |
| EP | 1727687 B1 | 9/2007 |
| SU | 1657412 A1 | 3/1989 |

OTHER PUBLICATIONS

International Search Report for International Application No. PCT/EP2011/073242 Dated Mar. 22, 2012.
(Continued)

*Primary Examiner* — Jeffrey J Restifo

(57) ABSTRACT

A variable track width vehicle axle has an outer axle casing (12) which supports two drive shafts (13) which are driven at their inner ends by drive means (23) and carry wheel attachment means (13a) at their outer ends. Each drive shaft including first and second parts (13a, 13b) which are in screw-threaded engagement with each other so that rotation of one part relative to the other changes the effective length of each shaft and thus the track width of the axle. A clutch means (16) is also provided which in a first position connects the two parts (13a, 13b) of each shaft to prevent relative rotation and in a second position disconnects the two parts of each shaft to allow relative rotation therebetween and rotates one of the screw threaded parts relative to the other part (13b) via the drive means (23) to change the effective length of each drive shaft.

10 Claims, 3 Drawing Sheets

(56) References Cited

U.S. PATENT DOCUMENTS

| | | | | |
|---|---|---|---|---|
| 2,562,720 | A | * | 7/1951 | Ickes .............................. 301/128 |
| 2,676,849 | A | * | 4/1954 | Houck et al. ....................... 301/1 |
| 2,788,077 | A | * | 4/1957 | Wittren ........................ 180/340 |
| 2,902,319 | A | * | 9/1959 | Mulder ......................... 301/128 |
| 4,317,596 | A | * | 3/1982 | Lemmon ........................... 301/1 |
| 4,350,222 | A | * | 9/1982 | Lutteke et al. ................ 180/209 |
| 4,556,258 | A | * | 12/1985 | Janson ......................... 301/128 |
| 4,565,539 | A | * | 1/1986 | Cook ........................... 446/462 |
| 4,986,386 | A | * | 1/1991 | Iwamoto et al. ............. 180/209 |
| 5,039,129 | A | * | 8/1991 | Balmer ......................... 180/308 |
| 6,139,045 | A | * | 10/2000 | Vandenbark et al. ......... 280/638 |
| 6,715,576 | B2 | * | 4/2004 | Filho .............................. 180/209 |
| 8,573,846 | B2 | * | 11/2013 | Mackin et al. .................. 384/40 |
| 8,944,447 | B2 | * | 2/2015 | Khoury ...................... 280/86.75 |
| 2003/0020324 | A1 | * | 1/2003 | Radke et al. ................... 301/128 |
| 2009/0302672 | A1 | * | 12/2009 | Brooks ......................... 301/128 |
| 2014/0260158 | A1 | * | 9/2014 | Nelson et al. ................... 56/16.7 |
| 2014/0292064 | A1 | * | 10/2014 | Hannukalnen et al. ........ 301/128 |

OTHER PUBLICATIONS

GB Search Report for GB Application No. 1021608.3 Dated Mar. 25, 2011.

* cited by examiner

VEHICLE AXLES WITH VARIABLE TRACK WIDTH

CROSS-REFERENCE TO RELATED APPLICATION

The present application claims the benefit of and priority from United Kingdom Application No. 1021608.3, filed Dec. 21, 2010, the entire disclosure of which is hereby incorporated by reference.

FIELD OF THE INVENTION

This invention relates to vehicle axles and in particular to variable width axles for use on vehicles such as agricultural and industrial tractors.

BACKGROUND

Variable track width axles are known for such vehicles to allow track width to be varied from a road width to a wider track width when operating off road and when undertaking various activities such as rough terrain work, front loader work and hard field work. A wider track width can aid stability and improve traction since the rear wheels can be set at a wider track than the front wheels and do not therefore have to work on ground loosened by the front wheels. One additional improvement due to wider track width is improvement to ride comfort when driving on rough terrain. In particular, wider track width decreases the lateral acceleration levels affecting the driver. These known arrangements have involved relatively complex and time consuming procedures to change the operating track width.

SUMMARY OF INVENTION

It is an object of the present invention to provide a variable track width axle which allows the track width of the vehicle to be changed easily and without the use of any tools or other equipment.

Thus according to the present invention there is provided a variable track width vehicle axle comprising an outer axle casing which supports two drive shafts which are driven at their inner ends by drive means and carry wheel attachment means at their outer ends, each drive shaft including first and second parts which are in screw-threaded engagement with each other so that rotation of one part relative to the other changes the effective length of each shaft and thus the track width of the axle, and clutch means which in a first position connects said two parts of each shaft to prevent relative rotation and in a second position disconnects said two parts of each shaft to allow relative rotation therebetween and rotates one of the screw threaded parts relative to the other part via the drive means to change the effective length of each drive shaft.

With such an arrangement, the vehicle operator can change the effective track width of the associated vehicle by initiating movement of the clutch means from its first position to its second position and then driving the vehicle either forwards or backwards to increase or decrease the track width.

The drive means may comprise a planetary gear (e.g. the axle reduction gear) in which a first member of the planetary gear drives the first part of each drive shaft and the clutch means, when in it's second position, connects the second part of each drive shaft to a second member of the planetary gear so that when the drive means are driven the first and second parts are rotated relative to each other to change the effective length of each drive shaft.

Conveniently, each drive shaft may comprise an outer tubular member driven from the first member of the planetary gear and supported for rotation within the casing, the first screw-threaded part of each drive shaft being splined for rotation with, and axial displacement relative to, the outer tubular member and carrying the wheel attachment means at it's outer end, and the second screw-threaded part being screw-threaded inside the first part and being connectable by the clutch means with the second member of the planetary gear.

The clutch means may comprises a collar splined onto the second screw-threaded part which has first coupling teeth for engagement with corresponding teeth on the first screw-threaded part when the collar is in the first clutch position to connect the first and second screw-threaded parts to prevent their relative rotation, the collar having second coupling teeth which, when the collar is moved to the second clutch position, connect the second screw-threaded part to the second member of the planetary gear to rotate the first and second screw-threaded parts relative to each other and change the effective length of each drive shaft.

The collar may be biased into the first clutch position to connect the first and second screw-threaded parts of each drive shaft and actuator means may be provided to move the collar to it's second clutch position.

Conveniently, the first member of the planetary gear may be a planet carrier and the second member of the planetary gear may be a sun wheel.

BRIEF DESCRIPTION OF THE DRAWINGS

The present invention will now be described, by way of example only, with reference to the accompanying drawings in which.

DESCRIPTION OF EXAMPLE EMBODIMENT

Figure 1:
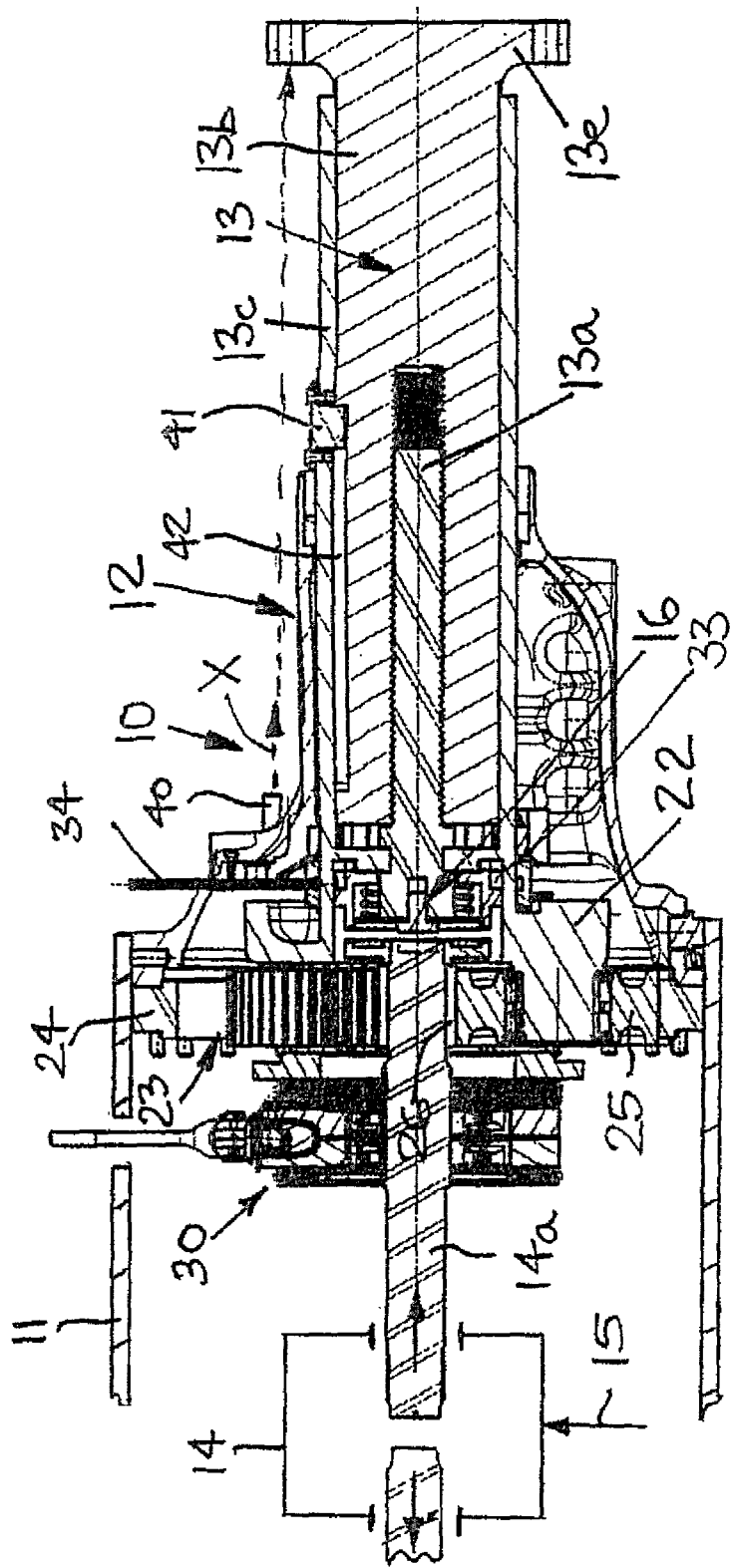
FIG. 1 shows a section through half of a rear axle for an agricultural tractor in accordance with the present invention with the axle in its minimum track width position.

Referring to the drawings, a tractor rear axle 10 has a cast centre housing shown diagrammatically at 11 to which are secured two trumpet housings 12, the right-hand one of which is shown in FIG. 1. The axle has two drive-shafts 13 the right-hand one of which is again shown in FIG. 1. These drive-shafts are driven via a centre differential 14 and a drive-shaft 15 from the associated tractor transmission, both of which are shown diagrammatically in FIG. 1.

For ease of description of the present invention only the right-hand half of the axle will be described in detail, it being understood that the left-hand half of the axle is an identical mirror image of the right-hand half.

Each driveshaft 13 has an inner part 13a and an outer part 13b which are in screw-threaded engagement with each other and an outer tubular member 13c within which outer part 13b is splined at 13d for co-rotation but which allows outer part 13b to move axially relative to tubular member 13c. The part 13b has a wheel attachment flange 13e at its outer end.

The inner end 22 of each tubular member 13c acts as a planet carrier for a planetary axle reduction gear 23 which has an outer annulus gear 24, planet gears 25 and a sun-gear 26 splined onto a driveshaft 14a driven from differential 14.

A multi-plate disc-brake 30 also operates on driveshaft 14a to brake the tractor half-axle in a conventional manner.

A clutch means 16 in the form of a collar 17 is splined onto the inner end of inner driveshaft part 13*a*. This collar 17 has a first set of coupling teeth 18 which are engageable with a cooperating set of coupling teeth 19 provided on tubular member 13*c*. A spring 20 which acts between collar 17 and a plate 13*f* bolted at 13*g* to the end of shaft 13*a* biases coupling teeth 18 and 19 into engagement which locks the inner part 13*a* to the outer part 13*b* of the driveshaft thus ensuring that no relative rotation can take place between parts 13*a* and 13*b* so that the effective length of the driveshaft cannot be changed.

The coupling collar 17 also includes second coupling teeth 31 which are engageable with co-operating coupling teeth 32 formed on flange 21 on shaft 14*a* by supplying pressurised oil to a chamber 33 provided on the right-hand side of collar 17 via a pipe 34 and passage 35 in outer tubular member 13*c*. When teeth 31 and 32 are engaged the head of bolt 13*g* enters recess 14*b* in the end of shaft 14*a*.

Thus with the coupling teeth 18 and 19 engaged under the influence of spring 20, the parts 13*a* and 13*b* of the driveshaft are coupled together and the screw threaded engagement of these parts with each other is not able to change the effective length of the driveshaft so that the driveshaft is simply driven through the planetary gear 23 via the planet carrier 22 and the outer tubular member 13*c*.

Figure 2:
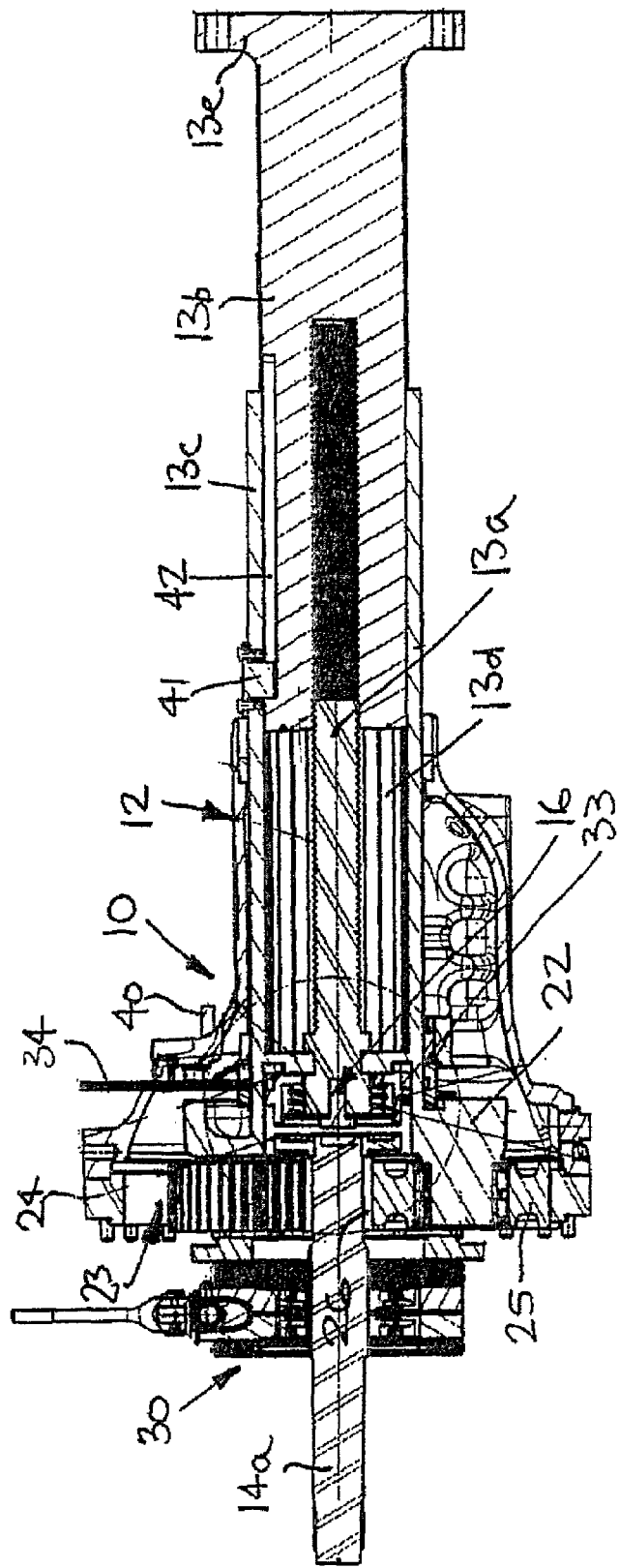
FIG. 2 shows a section through the axle of FIG. 1 in its maximum track width position.
Figure 3:
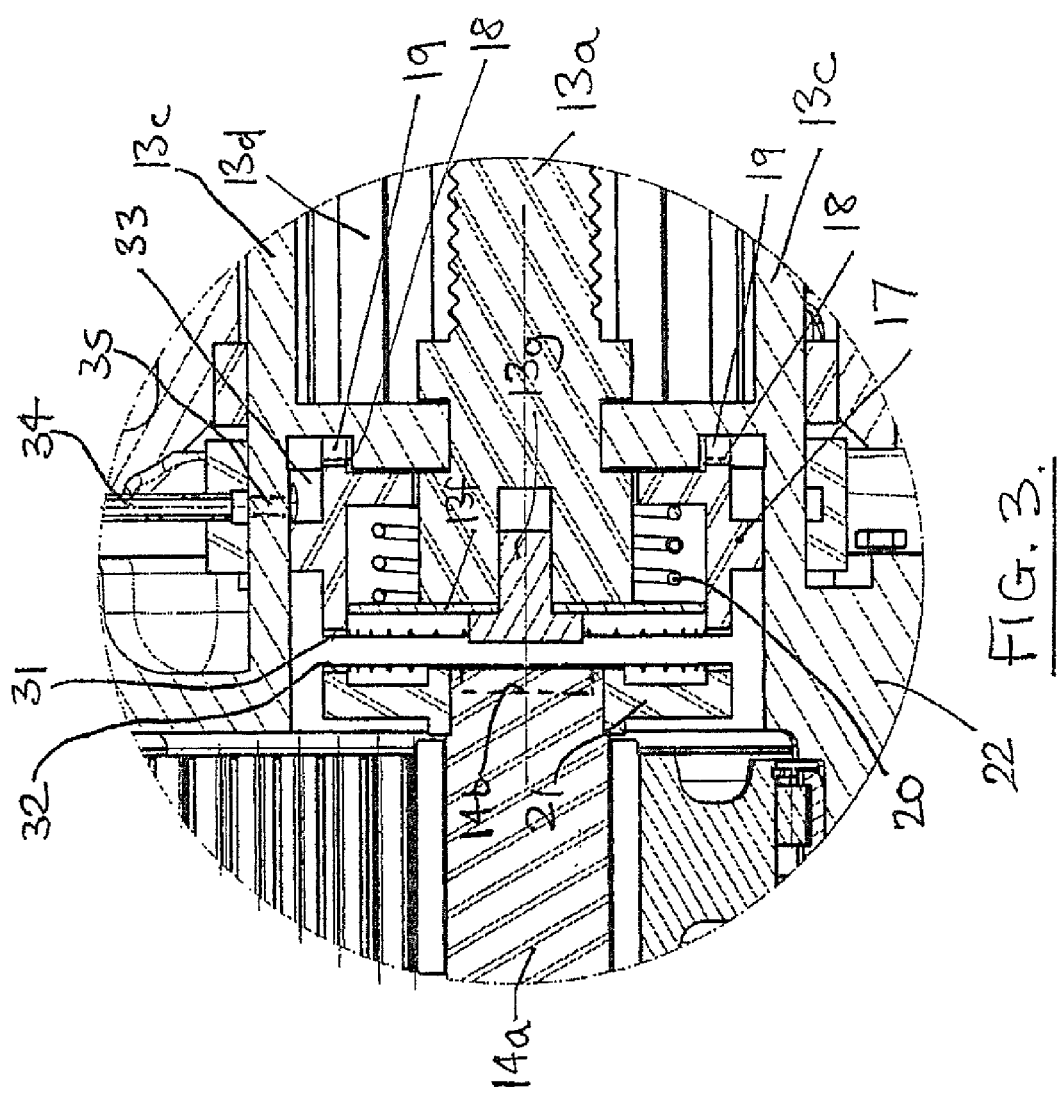
FIG. 3 shows the track adjusting clutch portion of FIG. 1 on a larger scale.

If the tractor driver wishes to change the track width of the vehicle to increase it's track width he operates a driver-operated control which supplies pressurised oil to pipe 34 and hence to chamber 33 thus displacing the collar 17 to the left to engage coupling teeth 31 and 32 and hence drive inner-shaft part 13*a* from driveshaft 14*a* and disconnect teeth 18 and 19 so that, as the vehicle is driven forwards by shaft 14*a* via planetary gear 23 and outer tubular member 13*c*, the inner shaft member 13*a* is also rotated relative to the outer shaft member 13*b* so that the effective length of the driveshaft is extended as shown in FIG. 2.

If the operator wishes to decrease the effective track width, the vehicle is driven in reverse whereupon the inner shaft part 13*a* rotates relative to the outer part 13*b* in the opposite direction thus decreasing the track width.

To stop over adjustment of the track width the driver is provided with information about current track width to recognize if track width is normal or wider than normal. Additionally, the position of track width adjustment system is needed to avoid the system damaging itself when making adjustments in track width. The system/operator can determine the operating position with a wide variety of sensors of different types. For this purpose one can use proximity switches, a linear position sensor or a rotating sensor which counts rotations and, with the aid of pitch information relating to the screw thread connection between parts 13*a* and 13*b*, can calculate axial displacement or position. One example is shown in the FIG. 1 in which an optical position sensor 40 measure the distance between wheel attachment flange 13*e* and trumpet housing part 12 as shown by the arrow X. Additionally, to avoid self damaging of the system or screwing the axle out from tube there should be also mechanical end stops for the adjustment system such as that shown at 41 on the outer tubular member 13*c* which operates in a slot 42 in part 13*b*. The clutch connecting the adjustment system can also be designed so that when system reaches its end stop 41 the clutch starts to slip.

As will be appreciated the above described arrangement enables the tractor driver to easily change the track width of the vehicle simply by pressurising the chamber 33 and driving the tractor either forwards or backwards as described above. This provides the particularly convenient arrangement for adjusting the vehicle track width which does not require the use of any tools or other equipment and which can be achieved quickly and efficiently.

The invention claimed is:

1. A variable track width vehicle axle comprising an outer axle casing which supports two drive shafts which are driven at their inner ends by a planetary drive gear and a carry wheel attachment flange at their outer ends, each drive shaft including first and second parts which are in screw-threaded engagement with each other so that rotation of one part relative to the other changes the effective length of each shaft and thus the track width of the axle, a first member of the planetary gear driving the first part of each drive shaft, and a clutch collar which in a first position connects said two parts of each shaft to prevent relative rotation and in a second position disconnects said two parts of each shaft to allow relative rotation therebetween and connects the second part of each drive shaft to a second member of the planetary gear so that when the drive gear is driven the first and second parts are rotated relative to each other to change the effective length of each drive shaft.

2. An axle according to claim 1 in which each drive shaft comprises an outer tubular member driven from the first member of the planetary gear and supported for rotation within the casing, the first screw-threaded part of each drive shaft being splined for rotation with and axial displacement relative to the outer tubular member and carrying the wheel attachment flange at its outer end, and the second screw-threaded part being screw-threaded inside the first part and being connectable by the clutch collar with the second member of the planetary gear.

3. An axle according to claim 2 in which the first member of the planetary gear is a planet carrier and the second member of the planetary gear is a sun wheel.

4. An axle according to claim 1 in which the first member of the planetary gear is a planet carrier and the second member of the planetary gear is a sun wheel.

5. A variable track width vehicle axle comprising an outer axle casing which supports two drive shafts which are driven at their inner ends by planetary drive means and carry wheel attachment means at their outer ends, each drive shaft including first and second parts which are in screw-threaded engagement with each other so that rotation of one part relative to the other changes the effective length of each shaft and thus the track width of the axle, a first member of the planetary gear driving the first part of each drive shaft, and clutch means which in a first position connects said two parts of each shaft to prevent relative rotation and in a second position disconnects said two parts of each shaft to allow relative rotation therebetween and connects the second part of each drive shaft to a second member of the planetary gear so that when the planetary gear are driven the first and second parts are rotated relative to each other to change the effective length of each drive shaft, and in which each drive shaft comprises an outer tubular member driven from the first member of the planetary gear and supported for rotation within the casing, the first screw-threaded part of each drive shaft being splined for rotation with and axial displacement relative to the outer tubular member and carrying the wheel attachment means at its outer end, and the second screw-threaded part being screw-threaded inside the first part and being connectable by the clutch means with the second member of the planetary gear, wherein the clutch means comprises a collar splined onto the second screw-threaded part which has first coupling teeth for engagement with corresponding teeth on the first screw-threaded part when the collar is in the first clutch position to connect the first and second screw-threaded parts to prevent their relative rotation, the collar having second coupling teeth which, when the collar is moved to the second clutch position connect the second screw-threaded part to the second member of the planetary gear to rotate the first and second screw-threaded parts relative to each other and change the effective length of each drive shaft.

6. An axle according to claim 5 in which the collar is biased into the first clutch position to connect the first and second screw-threaded parts of each drive shaft and a pressurised oil is supplied to a chamber to move the collar to its second clutch position.

7. An axle according to claim 5 in which the first member of the planetary gear is a planet carrier and the second member of the planetary gear is a sun wheel.

8. A variable track width vehicle axle comprising an outer axle casing which supports two drive shafts which are driven at their inner ends by a planetary gear and a carry wheel attachment flange at their outer ends, each drive shaft including first and second parts which are in screw-threaded engagement with each other so that rotation of one part relative to the other changes the effective length of each shaft and thus the track width of the axle, a first member of the planetary gear driving the first part of each drive shaft, and a clutch collar which in a first position connects said two parts of each shaft to prevent relative rotation and in a second position disconnects said two parts of each shaft to allow relative rotation therebetween and connects the second part of each drive shaft to a second member of the planetary gear so that when the planetary gear is driven the first and second parts are rotated relative to each other to change the effective length of each drive shaft, and in which each drive shaft comprises an outer tubular member driven from the first member of the planetary gear and supported for rotation within the casing, the first screw-threaded part of each drive shaft being splined for rotation with and axial displacement relative to the outer tubular member and carrying the wheel attachment flange at its outer end, and the second screw-threaded part being screw-threaded inside the first part and being connectable by the clutch collar with the second member of the planetary gear, wherein the clutch collar comprises a collar splined onto the second screw-threaded part which has first coupling teeth for engagement with corresponding teeth on the first screw-threaded part when the collar is in the first clutch position to connect the first and second screw-threaded parts to prevent their relative rotation, the collar having second coupling teeth which, when the collar is moved to the second clutch position connect the second screw-threaded part to the second member of the planetary gear to rotate the first and second screw-threaded parts relative to each other and change the effective length of each drive shaft.

9. An axle according to claim 8 in which the clutch collar is biased into the first clutch position to connect the first and second screw-threaded parts of each drive shaft and pressurised oil is supplied to a chamber to move the collar to its second clutch position.

10. An axle according to claim 8 in which the first member of the planetary gear is a planet carrier and the second member of the planetary gear is a sun wheel.

* * * * *